Sept. 8, 1931.  V. KARAPETOFF  1,822,737
POLYPHASE INTERSHEATH CABLE
Filed Dec. 7, 1929
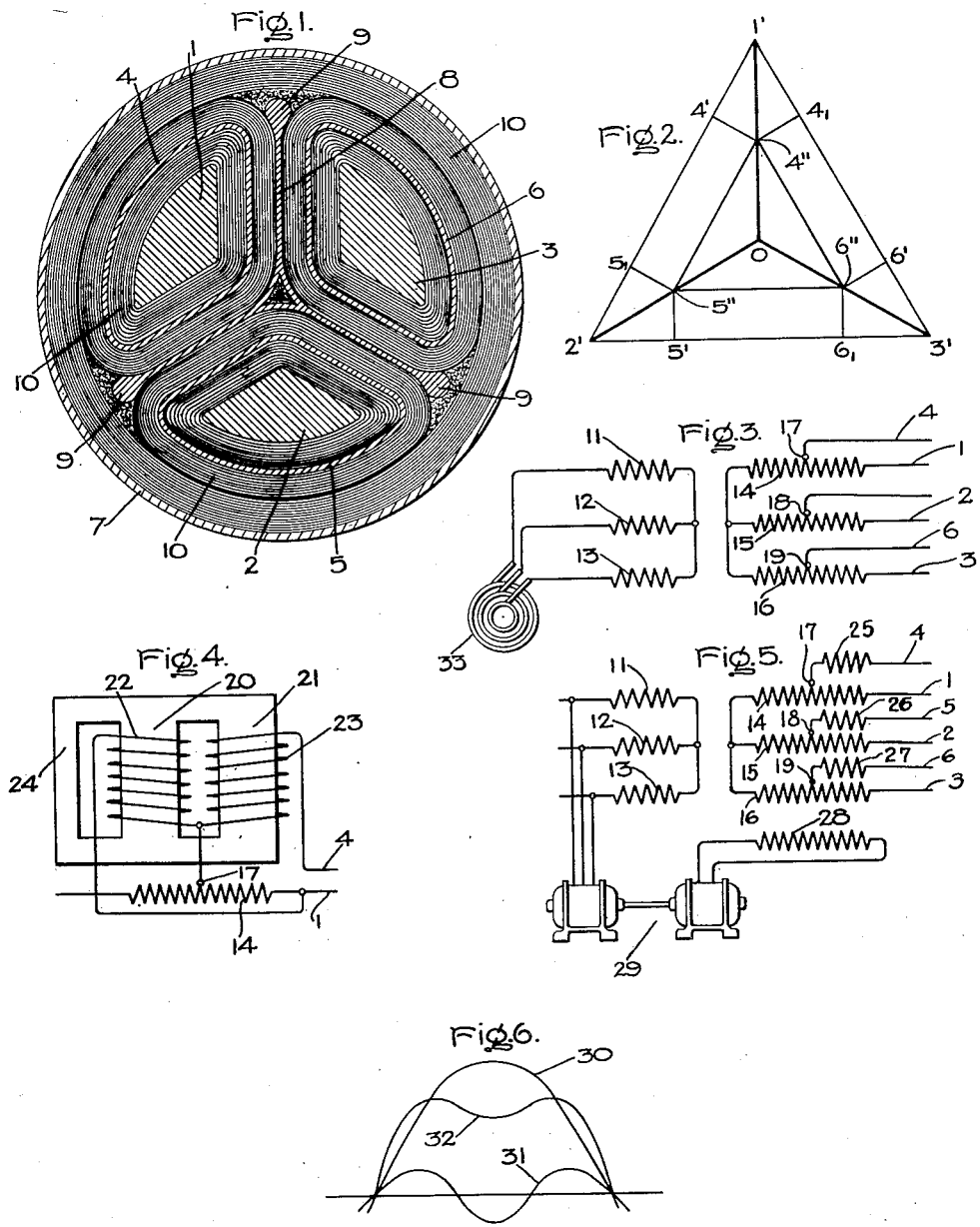
Inventor:
Vladimir Karapetoff,
by Charles E. Tullar
His Attorney.

Patented Sept. 8, 1931

1,822,737

UNITED STATES PATENT OFFICE

VLADIMIR KARAPETOFF, OF ITHACA, NEW YORK, ASSIGNOR TO GENERAL ELECTRIC COMPANY, A CORPORATION OF NEW YORK

POLYPHASE INTERSHEATH CABLE

Application filed December 7, 1929. Serial No. 412,499.

My invention relates to polyphase intersheath cables and particularly to intersheath connections for high voltage three phase intersheath cables.

It is a well known fact that the maximum dielectric stress in the insulation of a cable occurs at the surface of the metallic conductor, while the great bulk of the insulation is subjected to but a fraction of this stress. Thus as cable voltages increase, which is the present day trend, the breakdown stress of the insulation at this point is inevitably approached. Increasing the thickness of the insulation, other factors remaining the same, will serve to reduce the magnitude of this maximum stress but considerations of cost and space impose serious limitations on such practice. As a solution of this problem it has been proposed to provide equi-potential surfaces, or intersheaths connected to transformer taps, in the insulation, thereby dividing the insulation into sections for the purpose of making the measure of the maximum stress in any particular section of insulation the maximum potential across that section. These potentials are so chosen that the maximum stress in each section is substantially the same, thereby reducing the maximum stress in the section bounded on one side by the conductor and increasing it in the other section or sections, depending upon the number of intersheaths employed. As a result of this equalization of stresses, it is possible to either reduce the total amount of insulation or to increase the factor of safety while keeping the thickness of the insulation the same. Such practice is comparatively simple with respect to direct current and single phase cables. However, with polyphase cables such as three phase cables, it is not without difficulty due to the fact that the potential of the intersheath associated with any one of the conductors of a three phase cable must be at the proper value with respect to its associated conductor and its adjacent intersheath every time the potential between its associated conductor and any other conductor rises to a maximum, or twice every half cycle in a three phase cable and at the same time this proper intersheath potential should be its maximum, so as not to overstress the insulation at other times.

It is an object of my invention to provide a new and improved polyphase intersheath cable.

It is a further object of my invention to provide means for impressing the proper potentials on the intersheaths of polyphase intersheath cables.

My invention will be better understood from the following description taken in connection with the accompanying drawings and its scope will be pointed out in the appended claims.

In the drawings, like characters of which refer to similar parts throughout the several views, Fig. 1 represents a cross section of my cable; Fig. 2 is a vector diagram of the voltage relations in the cable and intersheaths; Fig. 3 is a diagrammatic showing of a compromise system of connections to the cable and intersheaths; Fig. 4 is a diagrammatic showing of wave form changing means which are insertable in the conductors connecting to the intersheaths; Fig. 5 is a diagrammatic showing of another type of wave form changing means which is applicable to the system shown in Fig. 3; while Fig. 6 is a diagram of the way the apparatus of Fig. 5 modifies the wave form of the potential applied to the intersheaths.

Referring now to Fig. 1, which is a cross section of my three phase intersheath cable, 1, 2 and 3 represent the three conductors, 4, 5 and 6 are their corresponding encircling intersheaths, while 7 is the outer cover or protective sheath which is usually constructed of lead. Separating the phases is a Y shaped conducting member 8, on the end of each of whose arms is an enlarged edge portion 9. Member 8, which is for the purpose of preventing burrowing or, in other words, the extension due to ion bombardment of incipient faults in the insulation, may be composed of three separate strips if desired. Enlarged edges 9 are for the purpose of providing a relatively low resistance path for the dissipation of any local potential which might otherwise reach high values. The remaining structure is the conventional cable insulation, indicated generally by reference character 10.

Referring now to Fig. 2, which illustrates vectorially the relation of the voltages of the elements in Fig. 1, vectors 0—1', 0—2' and 0—3' represent the voltages to neutral of conductors 1, 2 and 3, while vectors 1'—2', 2'—3' and 3'—1' represent vectorially the voltages between the cable conductors 1, 2 and 3. Assume now that calculations show that when the voltage between conductors 1 and 2 is a maximum, the potentials of intersheaths 4 and 5 should correspond to points 4' and $5_1$, on the vector diagram. In this condition the stress in the insulation between conductor 1 and sheath 4 is limited to the voltage 1'—4' in Fig. 2, the stress in the insulation between sheaths 4 and 5 is limited to the voltage 4'—$5_1$ in Fig. 2, while the stress in the insulation between sheath 5 and conductor 2 is limited to the voltage $5_1$—2'. The cable proportions and the intersheath potentials are so chosen that the stresses on a straight line between conductors 1 and 2 are fairly uniform. However, one-sixth of a cycle later, assuming clockwise rotation of the vectors, the voltage between conductors 3 and 1 will be a maximum, under which condition the voltage of the corresponding intersheaths should correspond to points 6' and $4_1$ on line 3'—1' of the vector diagram. Obviously, therefore, the potential of intersheath 4, to get the best results, should follow the vector 1'—2' for part of a cycle and vector 3'—1' for another part of a cycle. The voltage of intersheath 4 at other times is unimportant, provided it does not rise to a point where the adjacent insulation is unduly stressed.

Without special means, the potential of intersheath 4 cannot be made to follow two vectors. As an alternative, its potential may be made to follow an average or intermediate vector, which in this case is vector 0—1'. Thus if the potential of intersheath 4 corresponds to point 4" on Fig. 2, its instantaneous potential will be of the proper value whenever voltages 1'—2' and 3'—1' are maximum because point 4" is so chosen on vector 0—1' that its projection on vectors 1'—2' and 3'—1' will be points 4' and $4_1$ whenever the voltages represented by these vectors are a maximum. What has been said with respect to intersheath 4 is of course also true with respect to intersheaths 5 and 6, the only differences being in their phase relationships.

Referring now to Fig. 3, which illustrates diagrammatically the connections to the cables and intersheaths whereby the potentials of intersheaths 4, 5 and 6 are made to follow average vector voltages respectively. In this figure 11, 12 and 13 represent the individual Y connected phase windings of the primary of a transformer through which the cable is supplied with energy. These windings may be connected to any suitable source, shown as an alternator 33. Corresponding to primary windings 11, 12 and 13 are secondary windings 14, 15 and 16 which are connected to cable conductors 1, 2 and 3 respectively, as shown. Connected to secondary windings 14, 15 and 16 by means of properly positioned voltage taps 17, 18 and 19 thereon, are intersheaths 4, 5 and 6. Thus while the stresses or voltages between cable conductors are in delta even though their transformer secondary windings are Y connected, their respective intersheaths individually follow the proper fractional value of the individual phase or Y voltages, as illustrated in Fig. 2. The objection to this arrangement is that point 4" (or portions 5" and 6") actually represents a voltage whose maximum value is greater than is needed, so that there will be times when the insulation will be subjected to a greater stress than is necessary. In what follows I aim to describe two ways of overcoming this objection.

Referring now to Fig. 4 which illustrates one means for changing the wave form of the voltages applied to the intersheaths and as shown comprises an auto transformer connected to secondary winding 14. This transformer comprises a three-legged core member, two of whose legs, 20 and 21, have coils 22 and 23 wound thereon respectively, the third leg 24 being smaller in cross sectional area than legs 20 and 21. Coil 22 is connected between tap 17 on winding 14 and the terminal which is connected to conductor 1. Coil 23 is connected between tap 17 and intersheath 4.

The operation of the arrangement shown in Fig. 4 is as follows. The flux through leg 20 is sinusoidal, assuming the voltage of the source supplying primary windings 11, 12 and 13 to be sinusoidal. Leg 24 being smaller than the others in cross section is designed to saturate at the maximum value of the flux through it. As a consequence, a curve whose ordinates are the flux density in leg 24 and whose abscissæ are time would be flat topped. Therefore, so long as the flux in leg 20 is sinusoidal, a similar curve of the flux in leg 21 would be peaked. Hence the curve representing the voltage induced in coil 23 will be flat topped, it being remembered that it is the slope of the flux curve which corresponds to the value of the induced voltage. Thus the voltage impressed on intersheath 4 being a flat topped wave there will be no times when its value will rise above that which it is necessary to have when the line voltage between conductor 1 and any one of the other two conductors is a maximum. Although Fig. 4 shows the wave form changing auto transformer connected to winding 14 and intersheath 4 it is of course to be understood that in actual practice the other intersheaths and their respective transformer windings will also be so equipped.

Fig. 5 represents a second means for changing the wave form of the voltages applied to the intersheaths. In this figure, auxiliary transformer secondary windings 25, 26 and 27 are connected between taps 17, 18 and 19, on the main transformer secondary windings and intersheaths 4, 5 and 6 respectively. A single auxiliary transformer primary winding 28 is provided to energize the windings 25, 26 and 27, this winding being connected to the line supplying the main transformer primary windings 11, 12 and 13, through a synchronous frequency changer set 29, which triples the frequency and produces a third harmonic voltage in the intersheaths. As shown in Fig. 6, the result of this third harmonic is to flatten out the peak of the former sine wave. Thus curve 30 represents the sinusoidal voltage impressed on the intersheaths by their connections to the taps on the secondary windings of the main transformer, curve 31 represents the sinusoidal third harmonic voltage due to the auxiliary transformer, while curve 32 represents the resultant voltage of the intersheaths. In practice the two humps of this resultant will be made to have the proper values when the line voltages between conductors reach their maximum. Only a single auxiliary transformer primary winding and a single phase third harmonic alternator is necessary because in a three phase system the third harmonics are in phase.

While I have shown and described particular embodiments of my invention it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States, is:

1. In a distribution system, in combination, a three phase cable, a separate intersheath associated with each conductor of said cable, a three phase source of alternating current connected to said cable, and means for raising the potential of each intersheath to a maximum when the instantaneous value of the voltage between the conductor with which it is associated and either of the other conductors is a maximum and for preventing the voltage of said intersheaths from rising above this value.

2. In combination, a three phase high voltage cable, an intersheath associated with each conductor thereof, a source of substantially sinusoidal voltage for said cable including a transformer whose secondary windings are connected to the conductors of said cable, means connecting each intersheath to an appropriate tap on the proper secondary winding of said transformer, and means associated with each intersheath for flattening the peak of the wave form of the voltage impressed thereon.

3. In combination, a three phase cable, a separate intersheath associated with each conductor of said cable, means for impressing a different one of three substantially sinusoidal Y related voltages on each of the conductors of said cable and means for impressing an alternating voltage on each of said intersheaths which is in phase with and of the same frequency as the voltage impressed on its associated conductor, but whose wave form is such that it has two maximum length ordinates per half cycle which are at least sixty electrical degrees apart and which are symmetrical with respect to each half cycle of the wave.

4. The combination with a three phase intersheath high voltage cable of means for securing the proper intersheath voltage, said means including a wave form changing transformer.

5. The combination with a three phase intersheath high voltage cable of means for securing the proper intersheath voltage, said means including a wave form changing transformer, said transformer comprising a three-legged magnetic circuit, one of said legs being substantially smaller in cross section than the others, and separate windings on each of the remaining legs.

6. In combination, a three phase high voltage cable, a separate intersheath in said cable associated with each of the conductors thereof, a source of substantially sinusoidal high voltage three phase current for said cable, said source including a three phase transformer having a star connected secondary winding connected to said cable, means connecting each intersheath to the winding of said transformer to which its associated conductor is connected, said means comprising a transformer for producing a substantially flat topped voltage curve in each intersheath.

7. In combination, a three phase cable, a different intersheath in said cable associated with each of the conductors thereof, means for impressing the phase voltages of a three phase source on said conductors, means for impressing fractions of said phase voltages on the corresponding intersheaths, and means for impressing a third harmonic voltage on each of said intersheaths.

8. In a system for the transmission of high voltage electrical energy, in combination, a three phase cable, a different intersheath associated with each conductor of said cable and imbedded in the insulation thereof, a three phase transformer whose secondary windings are connected to said cable, said secondary windings being star connected, means connecting each of said intersheaths to a tap in the particular transformer secondary winding which is connected to the conductor associated with said intersheath, an auxiliary transformer secondary winding connected between each intersheath and its respective tap, a single primary winding associated with each of said auxiliary transformer secondary windings, and means for energizing said primary winding so as to induce a third harmonic voltage in each of said secondary windings.

In witness whereof, I have hereunto set my hand this 6th day of December, 1929.

VLADIMIR KARAPETOFF.